US008140213B2

(12) United States Patent
Boss et al.

(10) Patent No.: US 8,140,213 B2
(45) Date of Patent: Mar. 20, 2012

(54) DETECTION OF VEHICLE OPERATION UNDER ADVERSE CONDITIONS

(75) Inventors: Gregory J. Boss, American Fork, UT (US); Peter G. Finn, Brampton (CA); Rick A. Hamilton, II, Charlottesville, VA (US); Brian M. O'Connell, Cary, NC (US); James W. Seaman, Falls Church, VA (US); Keith R. Walker, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 728 days.

(21) Appl. No.: 12/245,834

(22) Filed: Oct. 6, 2008

(65) Prior Publication Data

US 2010/0087985 A1 Apr. 8, 2010

(51) Int. Cl.
*G01M 17/00* (2006.01)
*G07C 5/02* (2006.01)
*G07C 5/08* (2006.01)

(52) U.S. Cl. ............... 701/30; 701/31; 701/35; 340/439

(58) Field of Classification Search .................... 701/35, 701/29, 30, 31; 340/425.5, 438, 439
See application file for complete search history.

(56) References Cited

U.S. PATENT DOCUMENTS

| | | | | |
|---|---|---|---|---|
| 4,506,337 | A | 3/1985 | Yasahura et al. | |
| 4,849,655 | A | 7/1989 | Bennett | |
| 5,758,299 | A | 5/1998 | Sandborg et al. | |
| 5,892,434 | A | 4/1999 | Carlson et al. | |
| 5,995,898 | A | 11/1999 | Tuttle | |
| 6,064,970 | A | 5/2000 | McMillan et al. | |
| 6,119,059 | A * | 9/2000 | Tai et al. | 701/29 |
| 6,292,095 | B1 * | 9/2001 | Fuller et al. | 340/442 |
| 6,370,454 | B1 * | 4/2002 | Moore | 701/29 |
| 6,662,090 | B2 * | 12/2003 | Toyama et al. | 701/30 |
| 6,879,969 | B2 | 4/2005 | Engstrom et al. | |
| 7,686,872 | B2 * | 3/2010 | Kang | 96/417 |
| 2005/0075829 | A1 * | 4/2005 | Polimadei | 702/165 |

* cited by examiner

*Primary Examiner* — Toan C To
*Assistant Examiner* — Keith Frisby
(74) *Attorney, Agent, or Firm* — Patrick J. Daugherty; Driggs, Hogg, Daugherty & Del Zoppo Co., LPA

(57) ABSTRACT

Details relating to the operation of a vehicle under adverse conditions are recorded and collected. This data is particularly useful to forestall catastrophic failures, and to provide valuable information for potential buyers of used vehicles. Among the operating conditions that are considered are high levels of air contaminants, operation in extreme hot or cold temperatures, hauling heavy loads, as well as hard braking, turning and acceleration. In addition to the detection and recording of data, prorated maintenance schedules are recalculated and adjusted to accommodate for the operation of the vehicle under these adverse or less than ideal conditions. Typically, the data is stored in the on-board computers present in most vehicles. Periodic off loading of the data to the dealer and service providers is also provided.

21 Claims, 4 Drawing Sheets

DETECTION OF VEHICLE OPERATION UNDER ADVERSE CONDITIONS

FIELD OF THE INVENTION

This invention relates to the use of identification means in cooperation with the computer system aboard a vehicle to track service and maintenance activities relating to the vehicle when the vehicle is operated under severe conditions.

BACKGROUND OF THE INVENTION

It is common knowledge that a properly maintained motor vehicle is more dependable, safer, lasts longer, and increases the satisfaction of its owner as compared to a vehicle that is poorly maintained. Furthermore, following a good maintenance schedule helps to preserve the integrity of any warranty that the owner might have on the vehicle. In addition, the residual value of the vehicle is higher at the time of sale or trade-in.

The manufacturer of a vehicle typically provides a maintenance schedule that includes a recommended timetable or mileage schedule for tire rotation, engine tune-ups, lubrication, oil changes, front end alignments, radiator flushing, and the like. Failure to follow prescribed maintenance can seriously shorten the operative lifetime of the vehicle, and can adversely affect any applicable warranties on the vehicle itself or on the specific components. The maintenance schedule generally provides an accelerated timetable for oil changes and other maintenance items if the vehicle has been operated under less than favorable conditions.

The purchasing of a used vehicle is an inherently risky transaction. The buyer suffers from what economists term “an imbalance of information”, wherein the seller, or previous sellers, know vastly more about the vehicle being exchanged than the potential buyer.

SUMMARY OF THE INVENTION

The invention relates to systems and methods to detect and record if and when a vehicle is being operated under adverse conditions. Furthermore, the invention notes the specific nature of the adverse condition(s) and the date(s) on which the adverse operating conditions existed. Additionally, it recalculates and adjusts prorated maintenance schedules to accommodate for the operation of the vehicle under adverse or less than ideal conditions.

The system for monitoring the operation of a vehicle under adverse conditions includes a detection sensor, a transmitter and a circuit module. The detection sensor is installed on or in association with a vehicle component or an operating fluid that may be subject to use or abuse under an adverse operating condition. The transmitter comprises means for transmitting a signal from said sensor to a receiver upon detection of such use or abuse. The circuit module determines whether the adverse operating condition is outside of an acceptable range.

The invention also relates to a method for monitoring the operation of a vehicle under adverse conditions. The method comprises the following. An identification sensor is installed on or in a vehicle component or an operating fluid that may be subject to use or abuse under adverse operating conditions. An antenna or other device is installed for transmitting a signal from the identification sensor. An integrated circuit module is installed for receiving a signal from the sensor that reports the adverse operating conditions that are outside of an acceptable range. The signal is transmitted to a device such as an on-board computer for subsequent handling of the information relating to the operation of the vehicle.

The invention also relates to a method comprising producing computer executable program code. The code is stored in a computer readable medium installed on or associated with a motor vehicle. A program code is provided for deployment and execution on a computer system. The program code comprises instructions that are executed on the computer system. The execution of these instructions causes the computer system to read input obtained from a detector associated with the motor vehicle relative to the occurrence of a condition determined to be a potential adverse operating condition of the vehicle. Data from said detector is transferred to the computer system after which adjustments are made in the maintenance schedule with respect to said condition. The updated schedule is then stored in database storage.

In another embodiment, the invention also relates to a method for deploying an application for detecting and tracking information relating to the operation of a motor vehicle under adverse conditions. The method comprises providing a computer infrastructure being operable to a) receive information indicative of an adverse operating condition; b) generate a signal indicative of the nature and extent of the adverse condition; and c) store the indicia in a non-volatile memory.

BRIEF DESCRIPTION OF THE DRAWINGS

These and other features of this invention will be more readily understood from the following detailed description of the various aspects of the invention taken in conjunction with the accompanying drawings in which.

Figure 1:
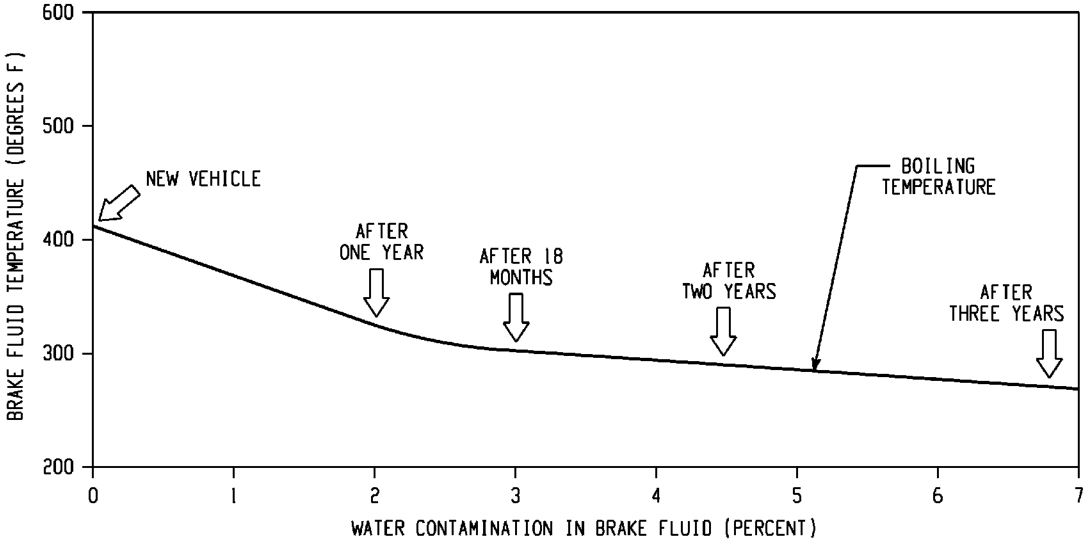
FIG. 1 illustrates the effect of water contamination in brake fluid.

The drawings are not necessarily to scale but instead are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

The present invention utilizes active and passive detection sensors in a system coupled by serial communication with vehicle computers in order to track and record driving patterns under adverse conditions. The system and method combines technologies whereby adverse driving conditions are detected, and data relating thereto is automatically recorded.

Among the adverse operating conditions are the following: high levels of air; fluid and gas contaminants; vehicle operation in extreme temperatures (hot or cold); strenuous driving patterns, such as mountain driving, off-road driving, or city driving; towing and hauling loads, such as a trailer or a boat; hard braking and rapid acceleration, under or over inflated tires, and driving at high altitudes with reduced atmospheric pressures.

The present invention includes the following components and systems, each of which will be described in detail:

1. Adverse condition detection systems
2. Adverse condition computer module

3. Prorated scheduler module
4. Operator notification module
5. Part replacement detection
6. Maintenance record storage module Adverse Condition Detection Systems The detectable adverse conditions described hereinabove are a small subset of possible detectable conditions. Numerous other conditions can be detected without deviating from the scope of the present invention. Therefore, the present invention is disclosed by way of illustration and the examples provided do not limit the invention. Several of these examples are disclosed as follows.

a) Air Contaminant Detection Module

Figure 4:
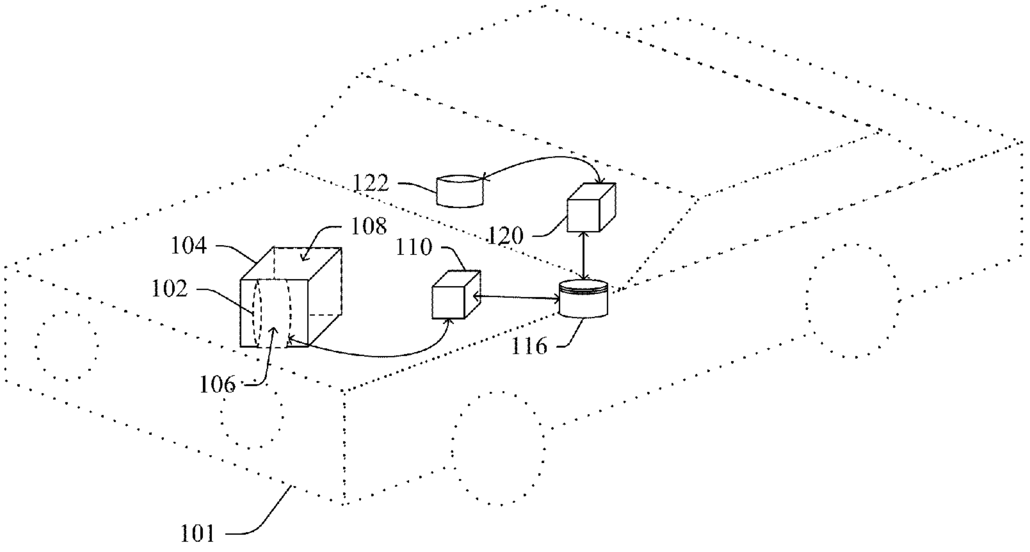
FIG. 4 is a block illustration of embodiments of sensors and modules according to the present invention.

FIG. 4 is a block illustration of an embodiment according to the present invention wherein a contaminant detection system module 110 is installed on a vehicle 101 in communication with an adverse condition computer module 116. The usable lifetime of an air filter is impacted by the quality of air that it filters. If the air contains high levels of contaminants, such as dust, dirt, or other airborne particulates, the filter should be changed more frequently than required under normal operating conditions. Failure to change an air filter at proper intervals results in performance degradation and increased strain on the engine. The technology needed to detect particulate matter in a sample of air is well known technology. The contaminant detection system module 110 repeatedly samples the air before it is filtered to detect the level of air contamination. A diverter 102 is installed into the vehicle's "air-box" 104 prior to the filtration stage air filter 108. At preset intervals, the diverter 102 is activated and a sample of air is directed to the contaminant detection chamber 106. The contaminant detection system module 110 samples the air in the chamber 106 to determine the parts per million of contaminates. If the containment level exceeds a preset threshold, the adverse condition computer module 116 is notified and the event is recorded.

Air sampling equipment of the type that is useful in practicing the teachings of the present invention is available from such sources as Airmetrics in Eugene, Oreg. and SKC, Inc. in Eighty Four, Pa.

b) Oil and Transmission Fluid Modules

Vehicle and oil manufacturers recommend oil change schedules for both ideal and severe driving conditions. Manufacturers consider the following conditions to be severe: temperature extremes: 'stop and go' driving patterns, excessive idling, hauling heavy loads, and towing. Severe conditions that affect the breakdown of oil generally also have the same effect on the transmission fluid. The same set of guidelines may be used to determine harsh conditions jointly, or additional logic can address and monitor the fluid in the transmission separately.

FIG. 4 also shows one or more sets of additional sensors 122 and associated sensor modules 120 that are installed on the vehicle 101 in communication with the adverse condition computer module 116. (For simplicity and clarity of illustration only one each of the sensors 122 and sensor modules 120 are shown in the present view, though it will be understood by one skilled in the art that a plurality of different ones of the sensors 122 and sensor modules 120 may be deployed). Thus, fluid sensor module(s) 120 via the sensor(s) 122 may thus determine parameters, such as viscosity or changes in viscosity, reserve alkalinity, fluid oxidation, and volatility of these fluids, thereby determining if these fluids are undergoing appreciable degradation. This information is then reported to the adverse condition computer module 116.

c) Temperature Sensor Module

Vehicles often include temperature sensors or thermometers 122 to detect and report (display) the outside temperature. These temperature sensors 122 are monitored by temperature sensor modules 120 to ascertain when the vehicle is being operated at temperatures that constitute adverse conditions. If a temperature sensor 122 reports that the temperature is outside of preset thresholds, the temperature sensor module 120 will notify the adverse condition computer module 116.

d) Driving Pattern Recognition Module

Several types of driving patterns are classified as severe driving, including but not limited to: stop and go driving, short trips, and excessive idling. A driving pattern recognition module 120 is employed to detect when the vehicle's operation matches any of these patterns.

e) Stop and Go Driving

The module recognizes stop and go driving by monitoring the speed of the vehicle over a given time span. If the vehicle accelerates to a certain speed and then decelerates to almost a full stop multiple times in a short period of time, the driving pattern may be categorized as "stop and go" driving. If the acceleration and deceleration exceed a preset threshold, using sensors, such as inertial accelerometers or decelerometers 122, the drive pattern recognition module 120 will notify the adverse condition computer module 116. The same sensor module 120 can be used to detect and report "fast acceleration" and "hard stop" patterns. Another type of brake sensor 122 that can be used for determining "hard stop" driving patterns is the one that is associated with the ABS braking system of most vehicles. Still another is one that comprises a magnetic field producing element and a Hall Effect sensor with one of the elements supported for movement relative to the other.

f) Short Trips

A short trip sensor module 120 recognizes short trip patterns by monitoring the length of time or the number of miles traveled from engine start to engine stop. If the vehicle 101 is started and stopped within a short period of time (generally recognized as 10 minutes), or short distance (such as 10 miles), this pattern constitutes adverse driving conditions. If this condition recurs x number of times over a preset threshold of time, the adverse condition computer module is notified.

g) Excessive Idling

An idling module 120 recognizes excessive idling by monitoring the vehicle's 101 speed when the engine is running. If the engine has been running for a fixed time period and vehicle movement has not occurred for a moderate percentage of that time period, the adverse condition computer module 116 is notified. Additional logic in the adverse condition computer module 116 tracks the number of times this condition is reported over a time period, and if the occurrences exceed a preset threshold, the module 116 records the incident as an adverse driving condition.

h) Towing and Load Sensor Module

Towing and hauling heavy loads exert additional strain on an engine and transmission as well as other vehicle components, such as the suspension system and tires. Manufacturers, therefore, consider towing and heavy load hauling to be a severe driving condition. Several methods are available to detect if the vehicle is towing an object. The following are two example methods to monitor if the vehicle is currently towing.

If the vehicle is equipped with a trailer wiring package, a wiring package sensor 122 included in the package is used to detect when the trailer wiring package circuit is closed. If the circuit is closed and the vehicle 101 is moving, the wiring package has been attached to a trailer and is currently towing an object behind it. If the wiring package sensor module 120 detects the closed circuit, it will notify the adverse condition computer module 116.

The trailer hitch may be modified to detect when it is engaged in towing activity. Sensors, such as strain gauges 122, are included on the trailer hitch to determine the forces exerted on the hitch. If an associated trailer hitch sensor module 120 detects a tow force, the adverse condition computer module 116 is notified.

The hauling of heavy loads can be monitored with the use of well known devices, such as strain gauges 122. Again, if such hauling exceeds preset limits so as to constitute an adverse condition, such a condition is reported to the adverse condition computer module 116.

i) Transmission Stress and Down-Shift Patterns

When traveling in environments with steep grades (mountains and hilly urban areas, such as San Francisco, Calif.), additional stress is placed on the engine and transmission. Often this is accompanied by automatic or manual down-shifting of the transmission. Shifting and speed are controlled and/or monitored by the vehicle computer. This data can be used to determine adverse driving conditions. As an example, on a flat grade, less power is required to maintain a constant speed of, for example, 55 MPH than on a 20% grade, or a 30% grade. Power required to achieve or maintain vehicle speed can be used to detect strenuous driving conditions. Detection of such conditions then evokes notification to the adverse condition computer module 116. These methods may be used separately or combined to detect if the vehicle is engaged in towing. This condition can also be identified (along with other harsh driving patterns or incidents) by detecting the engine's RPM, looking for a preset threshold for a preset time span. This would also be effective for determining travel up a steep grade, or a driver who does not shift appropriately (like driving 55 MPH in the third gear) as well as revving of the engine while in idle before a drag or street race.

j) Brake Fluid Temperature Sensor Module

Conventional brake fluids are hygroscopic. Over time, brake fluid begins to absorb moisture, and as moisture is absorbed into brake fluid, the boiling temperature of the fluid is lowered. The boiling point may be reduced to such a degree that the normal operation of the brake can cause the fluid to boil, thereby causing vapor to form in the brake system. This may result in the brakes becoming 'spongy' or may even cause a complete loss of braking ability.

FIG. 1 depicts the effects of water contamination in brake fluid over a period of several years. While braking, heat builds up in the brake system and is partially dissipated by the brake fluid. If the brake fluid boils, the braking system may be rendered incapacitated and brakes cannot be used to slow the vehicle. In ideal conditions, brake fluid is not heated to temperatures that would cause newer brake fluid, less than three years of age, to boil. However, if the vehicle is routinely subjected to patterns that cause the brake fluid temperature to be higher than a threshold, this qualifies as adverse driving conditions. When this occurs, it is imperative that the service schedule for brake fluid replacement be accelerated.

In order to determine if the brake system is consistently used in adverse conditions, a brake fluid temperature sensor 122 or module 120 is required at each of the four brake cylinders at the wheels as well as the master cylinder. These sensors 122/modules 120 measure the temperature of the brake fluid while the vehicle 101 is in use. If the temperature exceeds a preset threshold, the adverse condition computer module 116 is notified. Additional logic in the computer module 116 tracks the number, time, and frequency of such notifications. If enough notifications occur in a given time period, the system recognizes that the brake fluid replacement schedule should be altered.

Adverse Condition Computer Module

The adverse condition computer module 116 receives notifications from one or more adverse condition detection sensors 122 or sensor modules 120 that are installed throughout the vehicle 101. These sensors 122 may be positioned in locations that are suitable for detecting such factors as air contamination, extreme operating temperatures, driving patterns such as rapid acceleration and hard braking, heavy loads, and under or over inflation of tires. An antenna or other transmitting system may be installed sufficiently near to each sensor 122 to relay a detected signal to an integrated circuit module 120 or 116 installed within range of the transmitted signal. The IC module 116 or 120 contains the logic to interpret the notifications from the sensors 122 and to determine if the car is engaging in severe driving conditions. Additionally, the adverse condition computer module 116 is able to determine which systems and corresponding maintenance schedules are impacted by the multitude of sensor 122 notifications. Additionally, the adverse condition computer module 116 may be coupled to an operator notification module (not shown) to notify the vehicle's operator that the vehicle 101 is being operated under severe conditions. Notification can also be transmitted wirelessly to other parties, such as the dealer, the provider of a vehicle or parts warranty, or a service provider, of the severe operation status. The adverse condition computer module 116 may be an independent device or integrated into an existing on-board computer device, and it may be protected from tampering such as using a "black box" architecture.

Figure 2:
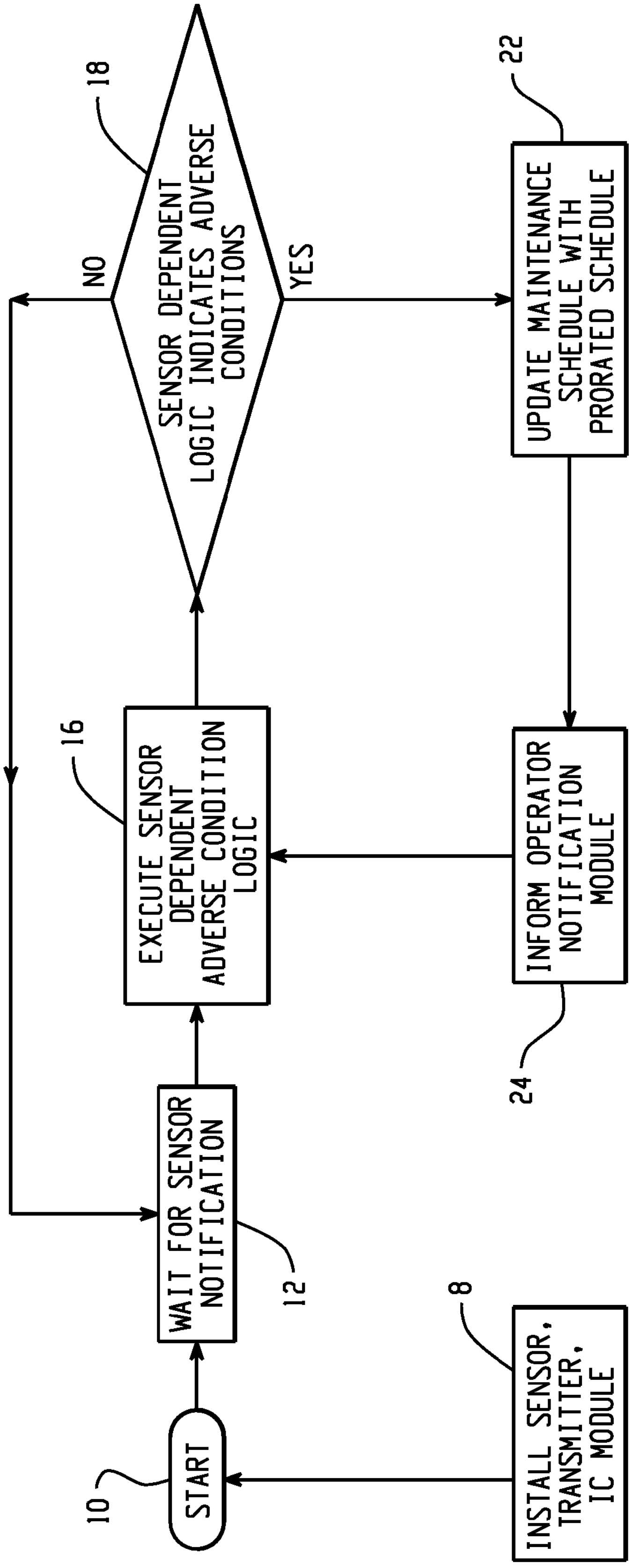
FIG. 2 shows a flowchart of the logic of a computer module.

FIG. 2 is a flowchart showing the logic of an adverse condition computer module useful in the present invention, for example with respect to the. sensors 122, sensor modules 110/120 and adverse condition computer module 116 installed on the vehicle 101 as illustrated in FIG. 4. These may be installed during the production of the vehicle, or may be acquired and installed as an after-market system. The logic commences at 10 when the vehicle ignition is turned on and the operator starts up the engine. If an adverse condition is detected by one of the sensors, a sensor notification is received at 12 and the relevant data concerning a possible adverse condition executes a sensor dependant adverse condition logic 16. If the logic indicates at 18 that no adverse condition exists, a message is returned to the sensor notification 12. If, however, the logic recognizes the presence of an adverse condition, an updated maintenance schedule 22 is prepared and is sent to the operator notification module 24, which in turn updates the sensor dependent adverse condition logic 16.

Prorating Vehicle Maintenance Schedules

There is currently no automated method to prorate a vehicle service schedule based on adverse usage. The algorithm shown below can be used for such prorating purposes, using as an example the oil change schedule for a vehicle. The oil in the vehicle under ideal conditions should be replaced every 7500 miles. Under severe conditions, the oil should be replaced every 3000 miles. Immediately after an oil change, the vehicle towed an object for 500 miles. The following calculation will determine the prorated maintenance schedule, indicating when the oil must be changed next:

$$7500-\left(\frac{500}{3000}*7500\right)=6250$$

In general terms, the formula for mile based schedules can be expressed as:

$$\text{Normal\_Schedule}-\left(\frac{\text{Advesrse\_Miles}}{\text{Adverse\_Schedule}}*\text{Normal\_Schedule}\right)=\text{Pro\_Rated\_Schedule}$$

In a preferred embodiment, a weighting mechanism can also be used based on the severity of driving conditions and the likely relative vehicle wear. As an example, operating the vehicle in an ambient temperature of 110° F. would carry a higher weight than the same operation at 95° F. Additionally, towing a heavy object would have a higher weight than towing a lighter object and a higher weight than operating at 95° F. Finally, if multiple adverse conditions exist, the individual calculations could be aggregated prior to executing the generic prorating logic.

Operator Notification Module

When a vehicle is operating under adverse conditions, it is necessary to inform the driver and perhaps others of such conditions. Several known methods can be used to inform the driver of severe conditions. One method is to use a standard dashboard light possibly in conjunction with an audible notification. More advanced vehicles may be capable of displaying added detailed information about the severe conditions using vehicle information displays. Such displays can accurately describe the severe conditions the vehicle is currently operating under and may additionally display the updated prorated maintenance schedule. Among these displays are meters, gauges and other similar visual warnings. In an extreme measure, the notification may take the form of an ignition interrupt, a speed governor, a temporary modification to performance settings, or other similar device.

While shown and described herein as a method and system for tracking maintenance services that have been performed on a vehicle, it is understood that the invention further provides various alternative embodiments. For example, in one embodiment, the invention provides a computer-readable/useable medium that includes computer program code to enable a computer infrastructure to send any one of a number of prerecorded telephone messages to a service provider, dealer, or even alert the driver of the adverse condition. To this extent, the computer-readable/useable medium includes program code that implements each of the various process steps of the invention.

It is understood that the terms "computer-readable medium" or "computer useable medium" comprise one or more of any type of physical embodiment of the program code. In particular, and referring to FIG. 3, the computer-readable/useable medium can comprise program code embodied on one or more portable storage articles of manufacture (e.g., a compact disc, a magnetic disk, a tape, etc.), on one or more data storage portions of a computing device, such as the memory 52 and/or the storage system 62 (e.g., a fixed disk, a read-only memory, a random access memory, a cache memory, etc.).

Communication throughout the vehicle can occur via any combination of various types of communication links. For example, the communication links can comprise addressable connections that may utilize any combination of wired and/or wireless transmission methods.

Figure 3:
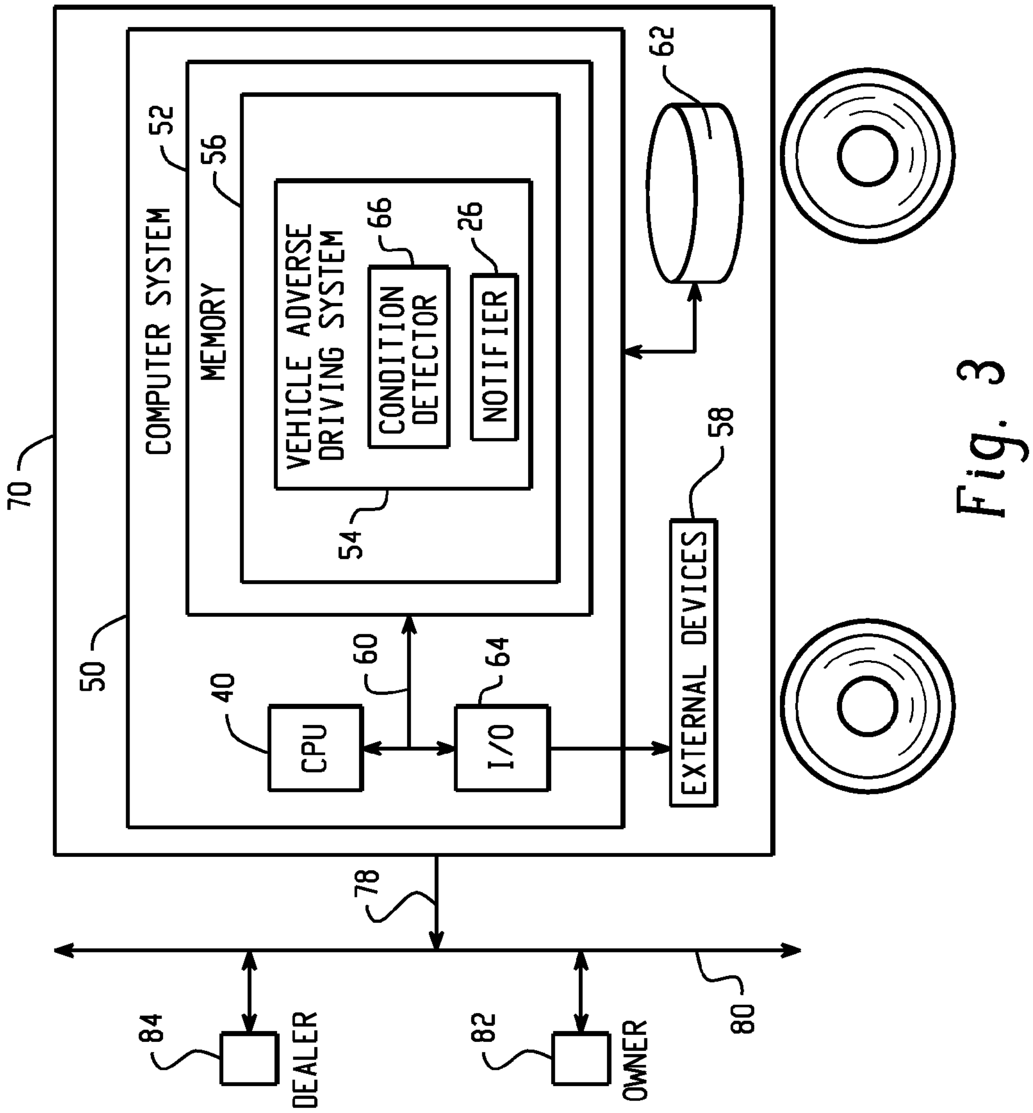
FIG. 3 exemplifies a computer implementation of the system of the present invention.

As shown in FIG. 3, a vehicle 70 includes a computer system 50. The system comprises a processing unit (CPU) 40, a memory 56, a bus 60, and input/output (I/O) interfaces 64. Within the memory 56 may be installed the vehicle adverse driving system 54 including an adverse condition detector 66, a notification module 26, and other components as needed or desired. Further, the computer system 50 is shown in communication with external I/O devices/resources 58 and storage system 62. In general, the processing unit of the computer system 50 executes computer program code, such as the code to implement the parts detection system, which is stored in the external memory 56 and/or database storage system 62. The adverse condition detector 66 can be, for example, a pressure or temperature gauge, a high or low fluid level detector, accelerometer, or strain gauge, depending on the condition or conditions being monitored.

While executing computer program code, the computer system 50 can read and/or write data to/from the memory 56, the storage system 62, and/or the I/O interfaces 64. The bus 60 provides a communication link between each of the components in computer system 50. The external devices 58 can comprise any of the previously mentioned components, such as the sensor or detector, the reader, the data stream converter and the user notification module.

Further, I/O interfaces 64 can comprise any system for exchanging information with one or more of the external devices 58. Still further, it is understood that one or more additional components (e.g., system software, math co-processing unit, etc.) not shown in FIG. 4 can be included in computer system 50. However, if computer system 50 comprises a handheld device or the like, it is understood that one or more of the external devices 58 (e.g., a display) and/or the storage system 62 could be contained within computer system 50, not externally as shown. The computer system can further include a wired or wireless connection 78 and bus 80 to allow it to communicate outside of the vehicle to, for example, an owner 82 or a dealer 84. This capability allows the transfer of updated information for any of the purposes heretofore described.

The storage system 62 can be any type of system (e.g., a database) capable of providing storage for information under the present invention. To this extent, the storage system 62 could include one or more storage devices, such as a magnetic disk drive or an optical disk drive. In another embodiment, the storage system 62 includes data distributed across, for example, a local area network (LAN), wide area network (WAN), or a storage area network (SAN) (not shown). Also, although not shown, additional components, such as cache memory, communication systems, system software, etc., may be incorporated into computer system 50.

The invention provides a business method that performs the process steps of the invention on a subscription, advertising, and/or fee basis. That is, a service provider could offer to manage the monitoring or reporting of the data. In this case, the service provider can create, maintain, support, etc., a computer system 50 on-board a vehicle 70. The computer system 50 performs the process steps of the invention for one or more customers, such as the owner or dealer. In return, the service provider can receive payment from the customer(s) under a subscription and/or fee agreement and/or the service provider can receive payment from the sale of advertising content to one or more third parties.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of an application/software program, component software/a library of functions, an operating system, a basic I/O system/driver for a particular computing and/or I/O device, and the like.

The computer system 50 is only illustrative of various types of computer infrastructures for implementing the invention. For example, in one embodiment, computer system 50 comprises two or more computing devices (e.g., a server cluster) that communicate over a network to perform the various process steps of the invention. Moreover, computer system 50 is only representative of various possible computer systems that can include numerous combinations of hardware.

To this extent, in other embodiments, computer system 50 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Moreover, the processing unit or CPU 40 may comprise a single processing unit, or be distributed across one or more processing units in one or more locations, e.g., on a client and server. Similarly, the memory 56 and/or the storage system 62 can comprise any combination of various types of data storage and/or transmission media that reside at one or more physical locations.

In one non-limiting implementation, the invention contemplates the use of one or more radio frequency identification (RFID) readers or the like variously located throughout the vehicle. The readers may be positioned in the vehicle so that the aggregate coverage by the one or more RFID readers covers the component parts of the vehicle that are likely to contain sensors. The use of RFID can be two-fold: 1) to relay information from the sensors to the computer module to avoid the use of wires, and 2) for the computer module to report information to the dashboard or consumer of the information, such as the dealership or potential buyer of the vehicle. The RFID tag could take on many forms. The RFID tag can be a passive tag, an active tag, or a semi-passive tag. With a passive tag, the reader(s) emits an electromagnetic field that induces an electrical current in an antenna of the tag. The electrical current provides power for the tag, for example, for powering an integrated circuit in the tag, which invokes the tag to emit or transmit the information stored in the tag (e.g., in Electrically Erasable Programmable Read-Only Memory, or EEPROM, etc.) via the antenna.

With an active tag, the RFID tag includes an internal power source such as a battery, a solar cell, etc., that powers the integrated circuit, which broadcasts the sensor information for reception by an authorized reader tuned to a broadcast frequency. Alternatively or additionally, the RFID tag may be powered from the battery of the vehicle. The RFID tag may also be semi-passive in that an internal battery or the vehicle's battery may provide power to activate the tag, but the field provided by the reader invokes the broadcast of the sensor information.

It should be understood that the invention is not limited solely to the use of RFID tags as sensors. Other similar devices such as RuBee (registered trademark of Visible Assets, Inc.) long wavelength tags, VLIS visible light identification tags and H-P Memory Spot tags can likewise be utilized as sensors in the practice of this invention.

While shown and described herein as a method and system for detecting adverse operating conditions relating to the operation of a vehicle, it is understood that the invention further provides various alternative embodiments. For example, in one embodiment, the invention provides a computer-readable/useable medium that includes computer program code to enable a computer infrastructure to monitor all systems in the vehicle. To this extent, the computer-readable/useable medium includes program code that implements each of the various process steps of the invention.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

The invention claimed is:

1. A method for monitoring the operation of a vehicle under adverse conditions, the method comprising:

activating at predetermined intervals an air diverter that is installed on a vehicle to sample incoming air upstream from and entering an air filter installed on the vehicle;

measuring via a contaminant detection sensor installed on the vehicle an amount of particulate contamination in the upstream air sampled by the air diverter at the predetermined intervals;

monitoring via the contaminant detection sensor the measured amount of particulate contamination in the upstream air for a high level of particulate matter outside of an acceptable range; and the contaminant detection sensor signaling to an integrated circuit module an occurrence of an adverse condition relating to operation of the vehicle in response to determining that the monitored measured amount of particulate contamination in the upstream air has a high level of particulate matter outside of an acceptable range.

2. The method according to claim 1, further comprising:

monitoring via a fluid detection sensor installed on the vehicle a property of a vehicle operating fluid selected from among a group consisting of brake fluid, coolant, motor oil, transmission fluid and differential fluid; and the fluid detection sensor signaling to the integrated circuit module an occurrence of an adverse condition relating to operation of the vehicle in response to determining that the monitored vehicle operating fluid is undergoing an appreciable degradation.

3. The method according to claim 2 wherein the vehicle operating fluid is brake fluid, and the fluid sensor detects and reports the percent of water contamination in the fluid.

4. The method according to claim 1, further comprising:

monitoring via a temperature sensor installed on the vehicle a temperature of the air outside of the vehicle; and the temperature sensor signaling to the integrated circuit module an occurrence of an adverse condition relating to operation of the vehicle in response to detecting a temperature outside of preset acceptable thresholds.

5. The method according to claim 1, further comprising:

monitoring movement of the vehicle via a driving pattern recognition module that detects at least one of a plurality of adverse condition driving patterns comprising: stop and go driving; short trips; hard acceleration; hard stops and excessive idling: and the driving pattern recognition module signaling to the integrated circuit module an occurrence of an adverse condition relating to operation of the vehicle in response to detecting at least one of the adverse condition driving patterns.

6. The method according to claim 1, further comprising:

determining a possible abusive operation of the vehicle as a function of the signaling of a plurality of the occurrences of adverse conditions relating to the operation of the vehicle.

7. The method according to claim 6, further comprising:

prorating a service schedule of the vehicle as a function of the determined possible abusive operation of the vehicle.

8. A method of providing a service for monitoring the operation of a vehicle under adverse conditions, the method comprising:

a computer infrastructure comprising a processing unit that:

activates at predetermined intervals an air diverter installed on a vehicle to sample incoming air upstream from and entering an air filter installed on the vehicle;

measures via a contaminant detection sensor installed on the vehicle an amount of particulate contamination in the upstream air sampled by the air diverter at the predetermined intervals;

monitors via the contaminant detection sensor the measured amount of particulate contamination in the upstream air for a high level of particulate matter outside of an acceptable range; and signals an occurrence of an adverse condition relating to operation of the vehicle in response to determining that the monitored measured amount of particulate contamination in the upstream air has a high level of particulate matter outside of an acceptable range.

9. The method according to claim 8, wherein the computer infrastructure processing unit further:

monitors via a fluid detection sensor installed on the vehicle a property of a vehicle operating fluid selected from among a group consisting of brake fluid, coolant, motor oil, transmission fluid and differential fluid; and signals an occurrence of an adverse condition relating to operation of the vehicle in response to determining that the monitored vehicle operating fluid is undergoing an appreciable degradation.

10. The method according to claim 9 wherein the vehicle operating fluid is brake fluid, and the fluid sensor detects and reports the percent of water contamination in the fluid.

11. The method according to claim 8, wherein the computer infrastructure processing unit further:

monitors via a temperature sensor installed on the vehicle a temperature of the air outside of the vehicle; and signals an occurrence of an adverse condition relating to operation of the vehicle in response to detecting a temperature outside of preset acceptable thresholds.

12. The method according to claim 8, wherein the computer infrastructure processing unit further:

monitors movement of the vehicle via a driving pattern recognition module that detects at least one of a plurality of adverse condition driving patterns comprising: stop and go driving; short trips; hard acceleration; hard stops and excessive idling; and signals an occurrence of an adverse condition relating to operation of the vehicle in response to detecting at least one of the adverse condition driving patterns.

13. The method according to claim 8, wherein the computer infrastructure processing unit further:

determines a possible abusive operation of the vehicle as a function of the signaling of a plurality of the occurrences of adverse conditions relating to the operation of the vehicle.

14. The method according to claim 13, wherein the computer infrastructure processing unit further:

prorates a service schedule of the vehicle as a function of the determined possible abusive operation of the vehicle.

15. An article of manufacture, comprising:

a computer readable tangible storage device having computer readable program code embodied therewith, the computer readable program code comprising instructions that, when executed by a computer processor, cause the computer processor to:

activate at predetermined intervals an air diverter installed on a vehicle to sample incoming air upstream from and entering an air filter installed on the vehicle;

measure via a contaminant detection sensor installed on the vehicle an amount of particulate contamination in the upstream air sampled by the air diverter at the predetermined intervals;

monitor via the contaminant detection sensor the measured amount of particulate contamination in the upstream air for a high level of particulate matter outside of an acceptable range; and signal an occurrence of an adverse condition relating to operation of the vehicle in response to determining that the monitored measured amount of particulate contamination in the upstream air has a high level of particulate matter outside of an acceptable range.

16. The article of manufacture of claim 15, wherein the computer readable program code instructions, when executed by the computer processor, further cause the computer processor to:

monitor via a fluid detection sensor installed on the vehicle a property of a vehicle operating fluid selected from among a group consisting of brake fluid, coolant, motor oil, transmission fluid and differential fluid; and signal an occurrence of an adverse condition relating to operation of the vehicle in response to determining that the monitored vehicle operating fluid is undergoing an appreciable degradation.

17. The article of manufacture according to claim 16 wherein the vehicle operating fluid is brake fluid, and the computer readable program code instructions, when executed by the computer processor, further cause the computer processor to detect and report the percent of water contamination in the fluid.

18. The article of manufacture of claim 17, wherein the computer readable program code instructions, when executed by the computer processor, further cause the computer processor to:

monitor via a temperature sensor installed on the vehicle a temperature of the air outside of the vehicle; and signal an occurrence of an adverse condition relating to operation of the vehicle in response to detecting a temperature outside of preset acceptable thresholds.

19. The article of manufacture of claim 18, wherein the computer readable program code instructions, when executed by the computer processor, further cause the computer processor to:

monitor movement of the vehicle via a driving pattern recognition module that detects at least one of a plurality of adverse condition driving patterns comprising: stop and go driving; short trips; hard acceleration; hard stops and excessive idling; and signal an occurrence of an adverse condition relating to operation of the vehicle in response to detecting at least one of the adverse condition driving patterns.

20. The article of manufacture of claim 19, wherein the computer readable program code instructions, when executed by the computer processor, further cause the computer processor to:

determine a possible abusive operation of the vehicle as a function of the signaling of a plurality of the occurrences of adverse conditions relating to the operation of the vehicle.

21. The article of manufacture of claim 19, wherein the computer readable program code instructions, when executed by the computer processor, further cause the computer processor to:

prorate a service schedule of the vehicle as a function of the determined possible abusive operation of the vehicle.

* * * * *